(12) United States Patent
Hollatz

(10) Patent No.: US 7,085,368 B2
(45) Date of Patent: Aug. 1, 2006

(54) METHOD OF PROVIDING A SCREEN-POP VIA SIP

(75) Inventor: Mike Hollatz, Huntley, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 244 days.

(21) Appl. No.: 10/888,061

(22) Filed: Jul. 9, 2004

(65) Prior Publication Data

US 2006/0008070 A1   Jan. 12, 2006

(51) Int. Cl.
    *H04M 3/00* (2006.01)
(52) U.S. Cl. .............................. 379/265.09; 379/266.1; 370/352
(58) Field of Classification Search ...................... None
    See application file for complete search history.

(56) References Cited

U.S. PATENT DOCUMENTS

| | | | |
|---|---|---|---|
| 6,870,848 B1 * | 3/2005 | Prokop | 370/395.2 |
| 2003/0076815 A1 * | 4/2003 | Miller et al. | 370/352 |
| 2004/0028080 A1 * | 2/2004 | Samarasinghe et al. | 370/486 |
| 2004/0062232 A1 * | 4/2004 | Sylvain | 370/352 |

FOREIGN PATENT DOCUMENTS

| | | |
|---|---|---|
| GB | 2 394 384 | 4/2004 |
| GB | 2 410 649 | 8/2005 |
| GB | 2410 650 | 8/2005 |
| GB | 2 411 789 | 9/2005 |
| GB | 2 413 238 | 10/2005 |
| WO | WO 03/024038 | 3/2003 |
| WO | 2 392 580 | 3/2004 |

OTHER PUBLICATIONS

RFC 2976, Article titled "The SIP INFO Method", S. Donovan, dynamisoft. Oct. 2000, downloaded from http://www.ietf.org/rfc/rfc2976.txt, Jan. 18, 2006.

* cited by examiner

Primary Examiner—Creighton Smith
(74) Attorney, Agent, or Firm—Welsh & Katz, Ltd.

(57) ABSTRACT

A method and apparatus for providing information to an agent of an organization through the Internet. The method includes the steps of detecting a call from a client of the organization through the Internet, assigning the call to an agent of the organization and automatically creating a record related to the call and downloading the record from a host to a terminal of the assigned agent where the record is encoded into a SIP INFO message.

27 Claims, 1 Drawing Sheet

METHOD OF PROVIDING A SCREEN-POP VIA SIP

FIELD OF THE INVENTION

The field of the invention relates to communication systems and more particularly, to the Internet.

BACKGROUND OF THE INVENTION

Automatic Call Distributors (ACDS) are known. Such systems are typically used by organizations to serve large numbers of callers through the Public Switch Telephone Network (PSTN). Typically, inbound calls are directed to a common telephone number of the organization and distributed to agents based upon some criteria (e.g., agent idle time).

In addition to handling inbound calls, ACDS may also process outbound calls. Typically, a controller monitors a work load of its agents. Where a work load of received calls falls below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information (script) may be displayed on a terminal of the agent that guides the agent through a sales presentation. DINS information may be used to identify an intended call target and to select an appropriate sales presentation for use by the agent based upon the intended call target.

While automatic call distributors work relatively well, they are not particularly well suited for handling Internet calls. Further, the standards that are used for processing switched circuit calls through the PSTN cannot be used within the Internet. In addition, even if there were such a standard, there is no protocol that allows for the seamless integration of remote database access with customer service applications. Accordingly, a need exists for a method that allows agents of an organization to handle calls with clients through the Internet, yet still allow for easy and convenient access by agents to remotely located customer databases.

SUMMARY

A method and apparatus are provided for processing information within a computer system. The method includes the steps of detecting a call from a client of the organization, assigning the call to an agent of the organization, and automatically creating a record related to the call and downloading the record from a host to a terminal of the assigned agent where the record is encoded into a SIP INFO message.

DETAILED DESCRIPTION OF AN ILLUSTRATED EMBODIMENT

Figure 1:
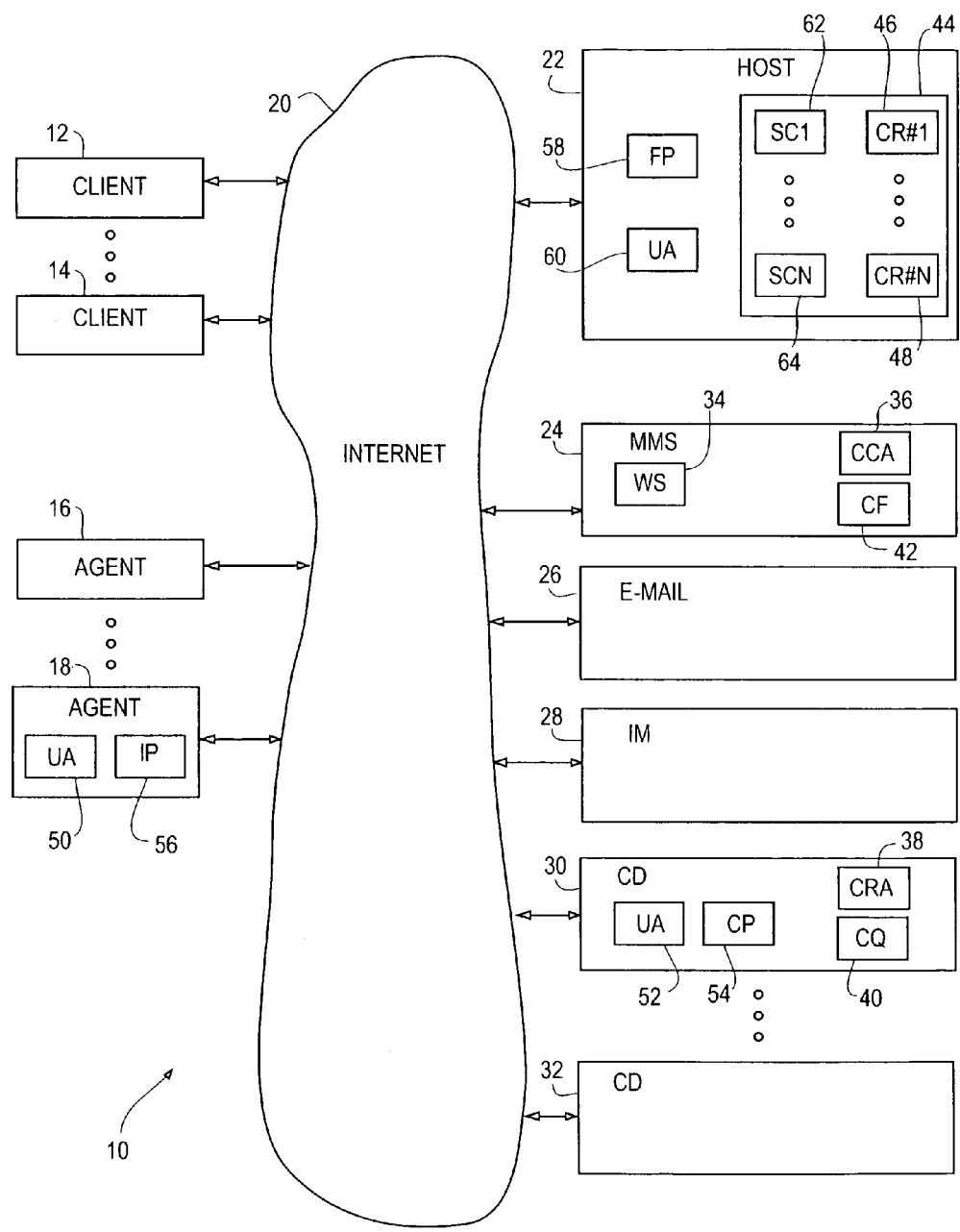
FIG. 1 is a block diagram of a contact distribution system in accordance with an illustrated embodiment of the invention.

FIG. 1 is a block diagram of a contact distribution system 10 shown under an illustrated embodiment of the invention. The contact distribution system may be used for connecting calls through the Internet 20 between clients 12, 14 and agents 16, 18. In general, the system 10 may be used by any of a number of different enterprise organizations (e.g., commercial, environmental, political, etc.) to advance the agenda of the enterprise.

The system 10 may include a number of computer resources 22, 24, 26, 28, 30 that function to form the connections between clients 12, 14 and agents 16, 18. As used herein, a computer resource 22, 24, 26, 28, 30 of the organization is a computer application or processor that processes information that is directed related to enterprise operations of the organization. Using the Open Systems Interconnection (OSI) network model, a computer resource is a user application that operates on Layer 7 of the OSI model.

As described below, at least some of the computer resources 22, 24, 26, 28, 30 perform predetermined services for other computer resources in furtherance of enterprise objectives. As used herein, a predetermined service performed by one resource for another means the processing of data to achieve some enterprise result that is not directly related to communication connections through the Internet.

Access to the contact center 10 of the organization by clients 12, 14 of the organization may be provided through the Internet 20 under any of a number of different processes. In order to promulgate the agenda of the organization to its clients 12, 14, the organization may publish contact information (e.g., e-mail addresses, instant message (IM) addresses or universal resource locators (URLs)), by advertising or otherwise, that identifies a communication path to the organization.

Under the illustrated embodiment, the contact distribution system 10 may include one or more servers 24, 26, 28 that may function to receive and initially process calls. A first server 26 may receive calls in the form of e-mails. A second server 28 may receive calls under an Instant Messaging (IM) format. A third, multi-mode server 24 may receive calls from one or more webpages downloaded to clients 12, 14 from a website 34 of the multi-mode server 24.

In the case where the organization is a manufacturer with many different products, a different e-mail address may be provided for each different product line. As such, the e-mail server 26 may receive e-mails directed to many different addresses that are all within one or more domain names used by the e-mail server 26. The use of different destination addresses may be used to provide the system 10 with a first level indication of the call type of the received call. The IM server 28 and multi-mode server 24 may be used in a similar manner.

Calls processed by the servers 26, 28, 30 may be initiated in any of a number of different ways. For example, a call from a client 12, 14 to the multi-mode server 24 may be initiated by activation of a SPEAK WITH AGENT softkey on a webpage downloaded from the multi-mode server 24. Alternatively, calls from clients 12, 14 may by initiated in response to pop-up ads posted to websites visited by clients 12, 14. Calls may also be initiated conventionally by a client 12, 14 activating an appropriate application (e.g., Outlook by Microsoft) and entering a Universal Resource Locator (URL) of the organization under an e-mail or IM format in response to a printed ad in a newspaper or magazine.

Calls from clients 12, 14, received by the servers 24, 26, 28 may be distributed to agents 16, 18 through call distributors 30, 32. As the calls arrive, the server 24, 26, 28 receiving the call may open a record 42 for each call that is identified by a unique call identifier. The record may include at least a source identifier (e.g., an e-mail address, URL, etc.) of the client 12, 14 originating the call and a destination identifier that identifies the call destination (e.g., e-mail address, URL, etc.) within the system 10. In the case of calls received by the multi-mode server 24, information regarding any webpages visited may also be included within the call record.

A copy of each call record 42 may be transferred to the host 22. Within the host 22, the information within the call record may be used to identify further information about the caller within a set of client records 46, 48 within a memory 44. For example, the source identifier may be used to classify the call as originating from existing or new customers. Information on webpages visited or on prior contacts with the client 12, 14 may be used to provide information regarding the type of call involved.

Any additional information regarding the call type may be transferred back to the server 24, 26, 28. Within the server 24, 26, 28, the information within the call record and, possibly, any additional information from the host 22 may be used within a call classification application 36 to further classify the call into one or more call types.

Once a call type has been determined, the server 24, 26, 28 may transfer the call to a call distributor 30, 32. The call distributor 30, 32 that the server 24, 26, 28 selects to handle the call may be based upon availability or upon the call type.

Selection of a contact distributor 30, 32 may be based simply upon status or upon some predetermined criteria. For example, the first call distributor 30 may be associated with agents 16, 18 who are primarily skilled at handling calls of a first call type and who have secondary skills in handling calls of a second type. Similarly, the second call distributor 32 may be associated with agents 16, 18 who are primarily skilled at handling calls of a second call type and who have secondary skills in handling calls of a first type.

As such, calls of the first call type will normally be transferred to the first call distributor 30 and calls of the second call type will be transferred to the second call distributor 32. However, if one or more of the call distributors 30, 32 is inoperative or otherwise unavailable or is overloaded, then calls may be handled by any other call distributor 30, 32.

If the primary call distributor 30, 32 is available, then the server 24, 26, 28 may transfer the call along with the record to the call distributor 30, 32. Within the call distributor 30, 32, a call routing application 38 may compare the contents of the call record with a list of agent skills and may assign the call to a qualified agent 16, 18. If an agent is not available, then the agent selection processor may place the call in a call queue 40 pending availability of a qualified agent.

If one or more qualified agent are available, then the call distributor 30, 32 may select an agent 16, 18 and transfer the call to the selected agent 16, 18. The call distributor 30, 32 may transfer the call to the selected agent 16, 18 in the form of a Session Initiation Protocol (SIP) INVITE (as defined by the Internet Engineering Task Force (IETF) RFC #3261.

In order to transfer the call, the call routing application 38 may transfer an identifier of the selected agent 16, 18, a communication format (e.g., VoIP, IM, e-mail, etc.), the source identifier of the client 12, 14 (and possibly the call record 42) to a call setup processor 54. The call processor 54 may transfer the agent and client identifiers and communication format to a user agent 52 (as defined by IETF RFC #3261) along with instructions to compose and send a SIP INVITE to the selected agent 16, 18.

Within a terminal of the selected agent 16, 18, another user agent 50 (as defined by IETF RFC #3261) may receive the INVITE from the call processor 54 and may send a response to the call routing application 38 acknowledging the INVITE and proceed to set up the call. Set up of the call with the client 12, 14 may proceed using conventional methods.

In addition to setting up the call between the agent 16, 18 and client 12, 14, it may also be necessary to provide the agent 16, 18 with client records 46, 48 and, possibly, script 62, 64 detailing the presentation to be made by the agent 16, 18 to the client 12, 14. Client records (or script) downloaded to the terminal of the agent 16, 18 may be displayed to the agent 16, 18 in the form of a screen pop.

Client records (and script) may be downloaded from the host 22 to the agent 16, 18 encoded within an INFO message (as defined by IETF RFC #3261). In this regard, a record processor 58 within the host 22 may retrieve client records 46, 48 (based upon the call record 42) or script (based upon a determined call type) and download those records to the selected agent 16, 18 through a local user agent 60. An information processor 56 within the terminal of the agent 16, 18 may receive those records through the user agent 50 and display those records on a display of the terminal of the agent 16, 18.

As each call is processed, the information downloaded to the agent 16, 18 from the host 22 may be requested and downloaded under any of a number of different methods. Under a first method, the call processor 54 of the call distributor 30 may forward an information request to the host 22 at the same instant as the call is forwarded to the selected agent 16, 18. The information request may be encoded as a SIP INFO message and may include the identifiers of the selected agent 16, 18 and client 12, 14 and the call record 42.

The record processor 58 may receive and decode the request and retrieve the requested records. The record processor 58 may then instruct the user agent 60 to compose an INFO message to the agent 16, 18 that includes the retrieved records.

Alternatively, the information processor 56 may request the records directly. Upon decoding the SIP INVITE from the call processor 54, the information processor 56 may compose an information request and forward the request to the host 22. The information request may also be encoded as a SIP INFO message.

A specific embodiment of method and apparatus for providing information to an agent of an organization through the Internet has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of providing information to an agent of an organization through the Internet, such method comprising the steps of:

detecting a call from a client of the organization through the Internet;

assigning the call to an agent of the organization; and automatically creating a record related to the call and downloading the record from a host to a terminal of the assigned agent where the record is encoded into a SIP INFO message.

2. The method of providing information as in claim 1 further comprising automatically displaying the record as a screen pop on the terminal of the agent.

3. The method of providing information as in claim 1 further comprising defining the record as containing client information.

4. The method of providing information as in claim 1 further comprising defining the record as containing script.

5. The method of providing information as in claim 1 further comprising automatically transferring a record request message containing an identifier of the selected agent and an identifier of the call from an agent selection application to the host where the record request message is encoded as a SIP INFO message.

6. The method of providing information as in claim 5 further comprising the agent selection application determining a call type of the call from information received along with the call.

7. The method of providing information as in claim 1 further comprising automatically transferring the call to the selected agent as a SIP INVITE.

8. The method of providing information as in claim 7 further comprising the agent terminal retrieving an identifier of the client from the SIP INVITE.

9. The method of providing information as in claim 8 wherein the step of automatically downloading the record to the agent further comprises the agent sending an information request to the host including the identifier of the client where the information request is encoded as a SIP INFO message.

10. An apparatus for providing information to an agent of an organization through the Internet, such apparatus comprising:

means for detecting a call from a client of the organization through the Internet;

means for assigning the call to an agent of the organization; and means for automatically creating a record related to the call and downloading the record from a host to a terminal of the assigned agent where the record is encoded into a SIP INFO message.

11. The apparatus for providing information as in claim 10 further comprising means for automatically displaying the record as a screen pop on the terminal of the agent.

12. The apparatus for providing information as in claim 10 further comprising defining the record as containing client information.

13. The apparatus for providing information as in claim 10 further comprising defining the record as containing script.

14. The apparatus for providing information as in claim 10 further comprising means for automatically transferring a record request message containing an identifier of the selected agent and an identifier of the call from an agent selection application to the host where the record request message is encoded as a SIP INFO message.

15. The apparatus for providing information as in claim 14 further comprising means within the agent selection application for determining a call type of the call from information received along with the call.

16. The apparatus for providing information as in claim 10 further comprising means for automatically transferring the call to the selected agent as a SIP INVITE.

17. The apparatus for providing information as in claim 16 further comprising means within the agent terminal for retrieving an identifier of the client from the SIP INVITE.

18. The apparatus for providing information as in claim 17 wherein the means for automatically downloading the record to the agent further comprises means within the agent terminal for sending an information request to the host including the identifier of the client where the information request is encoded as a SIP INFO message.

19. An apparatus for providing information to an agent of an organization through the Internet, such apparatus comprising:

a server that detects a call from a client of the organization through the Internet;

a call routing application that assigns the call to an agent of the organization; and a host that automatically creates a record related to the call and downloads the record from the host to a terminal of the assigned agent where the record is encoded into a SIP INFO message.

20. The apparatus for providing information as in claim 19 further comprising a display on the terminal of the agent that automatically displays the record as a screen pop.

21. The apparatus for providing information as in claim 19 further comprising defining the record as containing client information.

22. The apparatus for providing information as in claim 19 further comprising defining the record as containing script.

23. The apparatus for providing information as in claim 19 further comprising a call processor that automatically transfers a record request message containing an identifier of the selected agent and an identifier of the call from an agent selection application to the host where the record request message is encoded as a SIP INFO message.

24. The apparatus for providing information as in claim 23 further comprising a call routing application that determines a call type of the call from information received along with the call.

25. The apparatus for providing information as in claim 19 further comprising a SIP INVITE that transfers the call to the selected agent.

26. The apparatus for providing information as in claim 25 further comprising a user agent within the agent terminal that retrieves an identifier of the client from the SIP INVITE.

27. The apparatus for providing information as in claim 26 wherein the host that automatically downloads the record to the agent further comprises a user agent within the agent terminal that sends an information request to the host about the call where the information request includes the identifier of the client where the information request is encoded as a SIP INFO message.

* * * * *